United States Patent [19]
Brandt et al.

[11] Patent Number: 5,366,251
[45] Date of Patent: Nov. 22, 1994

[54] CONTAINER LABEL AND METHOD FOR APPLYING SAME

[75] Inventors: Thomas L. Brandt, Windsor; Daniel N. Willkens, Elmira, both of N.Y.

[73] Assignee: Brandt Technologies, Windsor, N.Y.

[21] Appl. No.: 58,810

[22] Filed: May 10, 1993

Related U.S. Application Data

[63] Continuation of Ser. No. 431,967, Nov. 6, 1989, abandoned, which is a continuation-in-part of Ser. No. 267,877, Nov. 7, 1988, abandoned.

[51] Int. Cl.⁵ ............................................. B42D 15/00
[52] U.S. Cl. ..................................... 283/81; 283/94; 40/650
[58] Field of Search .............. 283/81, 94; 428/346, 428/347; 40/306, 310, 594, 630, 299; 156/237, 238, 240

[56] References Cited

U.S. PATENT DOCUMENTS

| | | | |
|---|---|---|---|
| 1,922,767 | 8/1933 | Humphner | 283/81 |
| 3,661,625 | 5/1972 | La Mers | |
| 3,733,002 | 5/1973 | Fujio | 40/310 |
| 3,790,439 | 2/1974 | La Perre et al. | 428/346 |
| 3,907,974 | 9/1975 | Smith | 156/240 |
| 3,983,645 | 10/1976 | Rycroft | 40/630 |
| 4,061,808 | 12/1977 | Sato | |
| 4,135,033 | 1/1979 | Lawton | 428/346 |
| 4,219,596 | 8/1980 | Takemoto et al. | 156/238 |
| 4,313,994 | 2/1982 | Kingston | 428/347 |
| 4,444,839 | 4/1984 | Dudzik et al. | 428/346 |
| 4,526,405 | 7/1985 | Hattemer | 283/81 |
| 4,548,857 | 10/1985 | Galante | 156/240 |
| 4,577,204 | 3/1986 | Shibata et al. | 283/114 |
| 4,585,254 | 4/1986 | Adams | 283/81 |
| 4,587,158 | 5/1986 | Ewing | 283/81 |
| 4,608,284 | 8/1986 | Roales | 428/346 |
| 4,724,166 | 2/1988 | deBruin | |
| 4,741,791 | 3/1988 | Howard et al. | 156/237 |
| 4,849,043 | 7/1989 | Instance | |

OTHER PUBLICATIONS

International Search Report–PCT/US89/04888–dated Feb. 6, 1990.

*Primary Examiner*—Fridie: Willmon
*Attorney, Agent, or Firm*—Sughrue, Mion, Zinn, Macpeak & Seas

[57] ABSTRACT

A thin film label, either clear or opaque, is printed with an ink layer and a multiple-layer heat-activated adhesive layer for bonding to a glass container.

15 Claims, 3 Drawing Sheets

LABEL EXPLODED VIEW

LABEL EXPLODED VIEW

CONTAINER LABEL AND METHOD FOR APPLYING SAME

This is a continuation of application No. 07/431,967 filed on Nov. 6, 1989 now abandoned, which is a continuation-in-part of U.S. application No. 07/267,877, filed Nov. 7, 1988, now abandoned, and is related to concurrently filed application Nos. 07/432,442, 07/431,968 and 07/432,441, the disclosures of said applications being incorporated by reference herein.

BACKGROUND OF THE INVENTION

The present invention is directed to a technique for labeling containers, and more particularly to a technique for applying decorative and/or informational labels to glass containers.

Glass containers are currently labeled in three different ways. The predominant method is printed paper labels glued to the container at the time of filling and sealing. Such labels offer almost unlimited art potential and are commonly used on food, and both returnable and non-returnable beverage containers. This is the lowest cost technique, but offers little resistance to label damage. Also, the glue systems used are a constant source of problems in high speed bottle filling operations.

A second, and more recently developed, container labeling technique is that of applying a thin styrofoam label to cover the container from shoulder to heel, with the decorative and/or informational material being printed on a more dense outer skin of the styrofoam label. This is widely used on lighter-weight one-way bottles common in the beverage industry. It offers some impact resistance and a large surface area for printing product information and instructions, as well as company logos. Of necessity, it covers a majority of the container and prevents visual inspection of the contents by the consumer. In addition, it is more costly than the paper label, has little durability and becomes easily soiled. Because the printing surface is relatively rough, high definition printing is not possible. It also becomes a contaminate at the glass recycling center as well as at the glass plant when remelting the container.

A third container labeling technique is that of printing ceramic ink directly on the container surface using a screen printing technology. While the label appearance is generally good, the technique is typically limited to two or three colors due to cost considerations. A recent development is the preprinting of a ceramic ink decal which is then transferred to the glass container surface. This permits high definition printing and offers greater opportunities for color and art variety. Fired ceramic inks are extremely durable and will survive the alkali washing processes required of a returnable container.

However, both the direct printing ceramic ink and ceramic ink decal techniques require subsequent high temperature firing to fuse the ink to the glass substrate. In addition, while the preprinted ceramic ink label reduces the technical problems somewhat, both techniques require extreme attention to detail, a high level of maintenance and are run off-line at slow speed, with high labor costs. Due to the high cost, ceramic inks are the least commonly used labeling technique.

SUMMARY OF THE INVENTION

It is an object of the present invention, with certain variations, to overcome the above-described disadvantages of prior art glass container labeling techniques.

More particularly, it is an object of this invention to provide a label which is durable, highly impact resistant and abrasion resistant and permits the highest quality graphics.

It is a further object of this invention to provide a clean, self-contained adhesive bonded to the label that will insure tight, waterproof adhesion of the label to the glass container.

These and other objects are achieved according to the present invention by a label comprising an opaque or clear film substrate, which has preferably been coated on both sides with acrylic to serve as a compatible interface bond with the other materials used in the process and also to provide a high gloss surface. Graphics are printed on the acrylic layer, preferably using a solvent-based acrylic ink. The graphics can be reverse printed when the film is clear, which gives the appearance of the "fired on" label. When the film is opaque, the graphics are front surface printed using the opaque film as a background or part of the graphics. The label is then provided on its container side with a two-layer, heat-activatable adhesive, activatable on contact with the heated container.

BRIEF DESCRIPTION OF THE DRAWINGS

The invention will be more clearly understood from the following description in conjunction with the accompanying drawings, wherein.

DETAILED DESCRIPTION OF THE INVENTION

Figure 1:
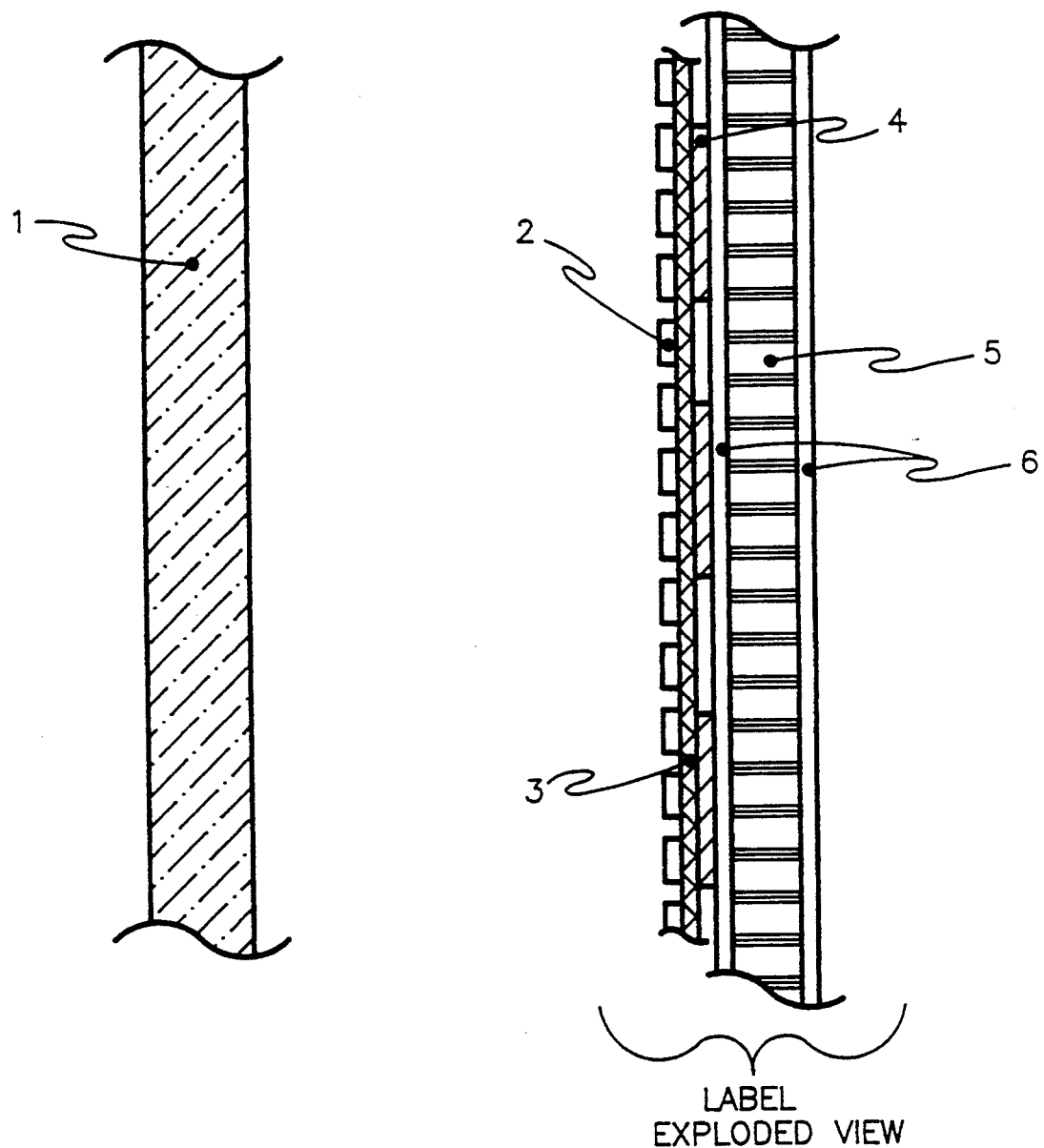
FIG. 1 illustrates the construction of a label according to the present invention, with a transparent film layer.

Referring to FIG. 1, the glass bottle is shown at 1 with the label itself being shown in exploded view at the right side of the Figure. The label according to this invention comprises a film substrate 5, such as polypropylene, which has been coated on both sides with acrylic 6. Polypropylene was selected for cost, durability, clarity, and availability, although other materials would also be acceptable. The acrylic coating 6 serves as a compatible interface bond with the other materials used in the process and also provides a high gloss surface. A suitable acrylic coated polypropylene film is available from Mobil Chemical Company.

Figure 2:
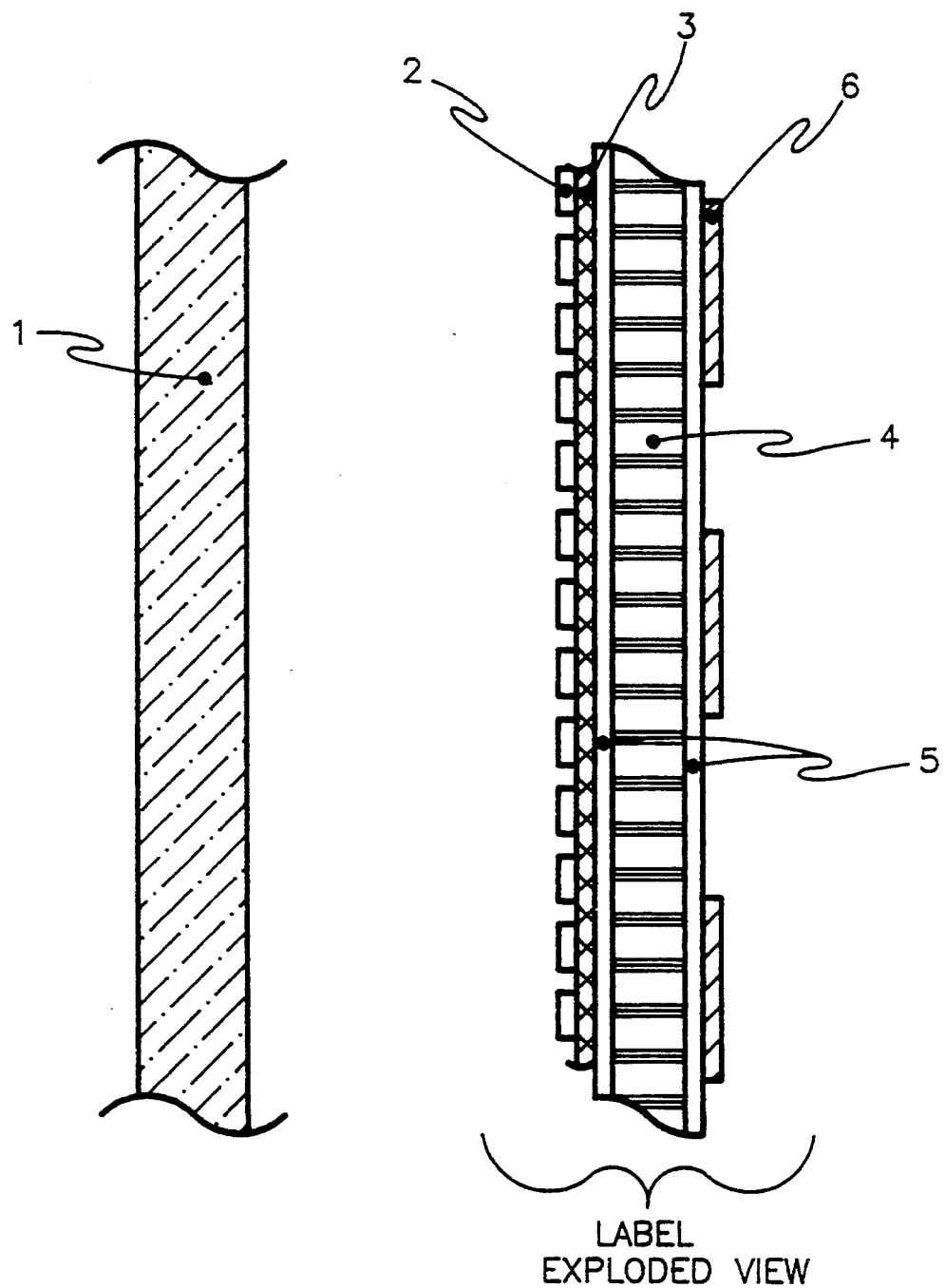
FIG. 2 illustrates the construction of a label according to the present invention, with an opaque film layer.

Graphics are printed on the acrylic layer 6 via ink 4. A gravure printing press is the preferred method of printing because of its very high quality, very high volume capability and well as low cost due to its high speed, although other printing techniques could be employed, if desired. The graphics can be reverse printed (FIG. 1) or front surface printed (FIG. 2). When the film 5 is clear reverse printing gives the appearance of a "fired on" label. When the film 5 is opaque, the graphics are front surface printed (FIG. 2) using the opaque film as a background or part of the graphics.

In either case, solvent based acrylic inks readily available from printing ink suppliers are preferred, although these are not the only inks which may be acceptable. The inks may be cured with heat, ultraviolet light or electron beam.

Adhesive is then printed over the entire bottle side of the label, including the graphics in the case of the clear film substrate. In the case of a clear film where the graphics are on the bottle side of the film 5, all of the printing, both ink and adhesive, is completed in one pass through the printing press. In the case of the opaque film, the adhesive is printed on the opposite side of the film from the graphics.

The adhesive is a compound of several materials, all commercially available, which when applied to the label form a heat-activated adhesive. The adhesive is preferably made up of two layers which act together to bond the film and ink to the glass. The first layer 3, printed after the graphics are printed, is a solvent based vehicle, such as that available from Sun Chemical Corporation as "PG890334". The second adhesive layer 2 is also printed, in this case in a horizontal line pattern. The space between lines of adhesive layer 2 prevents the entrapment of undesirable air under the label by allowing it to escape along the paths formed by the spaces. In the preferred embodiment herein, the layer is made up of a mixture of two materials in the range of ratios of 50:1 up to 10:1. The greater of the two materials is an adhesive such as "adcoat 50C30" available from Morton International Company. The lesser of the two materials is a coupling agent such as "A-187" available from Union Carbide Corporation. The materials are mixed prior to application to the press, and the mixture has an observed shelf life of approximately 24 hours.

Each of the adhesive layers is heat dried, although with some reformulation the layers may be printed and cured with ultra-violet or electron-beam energy. The first layer serves as a bonding layer between the adhesive layer 2 and the acrylic coating on the polyprolene substrate, and the second layer bonds to the glass.

The adhesive is formulated to maintain a label bond to the glass container when wet, such as in the hot water pasteurization process common in the beer industry as well as long term cold water submersion practiced by consumers of beverages and foods packaged in glass containers. Printing the adhesive on the label insures complete coverage of the label and therefore complete label bonding to the glass container, as well as eliminating the often messy water-based and hot-melt adhesives commonly used at present.

Application of the label to the glass container is accomplished using commercially available labeling equipment. Immediately prior to labeling, the container surface may be heated to approximately 200° F. At this glass surface temperature, the adhesive is instantly activated by the hot glass surface and provides a strong bond which allows subsequent conveyorized handling without label movement or damage. Upon cooling to ambient temperature, the adhesion of the label to the glass surface is stronger than the film itself.

Figure 3:
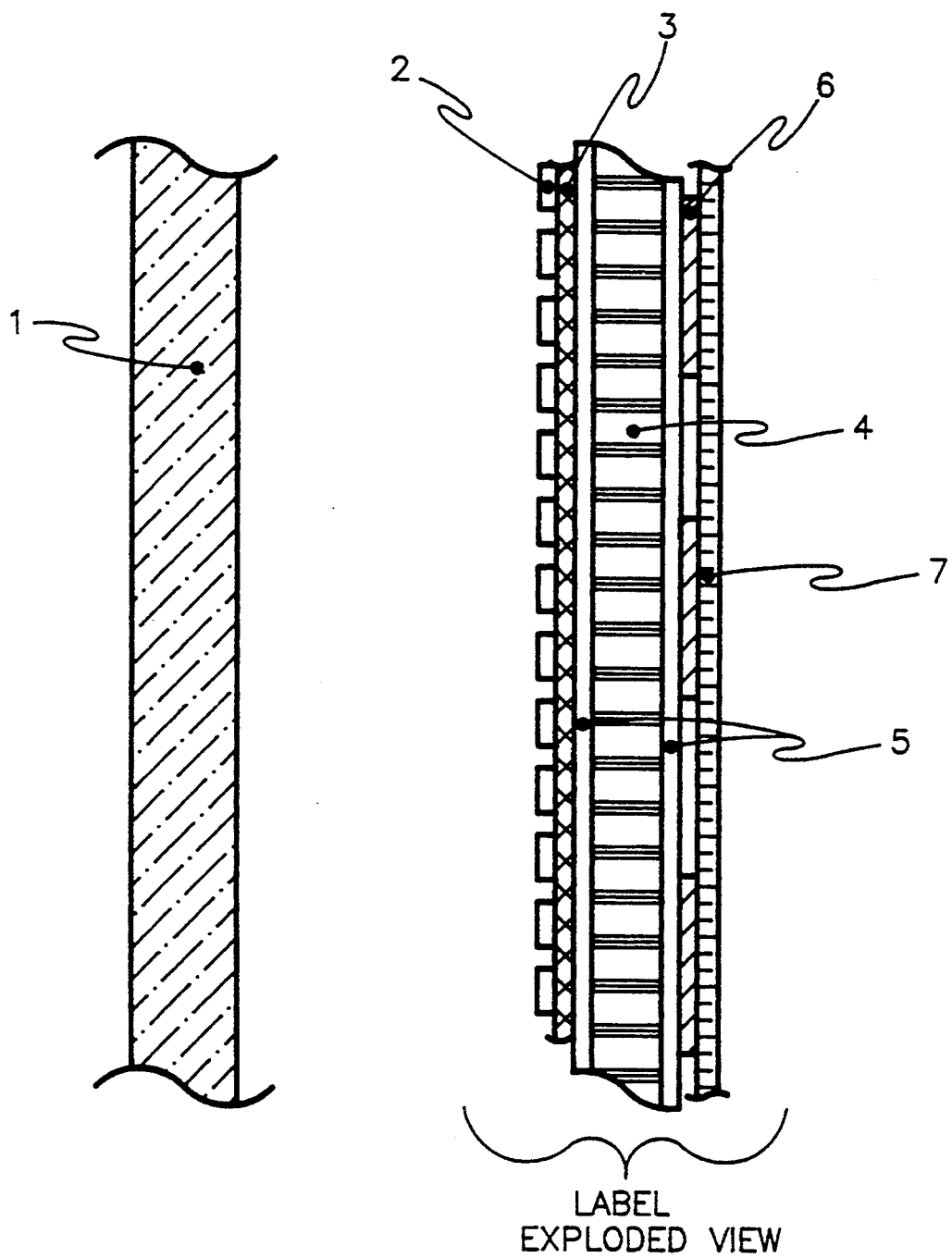
FIG. 3 illustrates the construction of a label according to the present invention with an opaque film layer, and having an anti-abrasive cover layer.

The glass container, when labeled and described above, may be further processed, e.g., by applying a protective film 7 as shown in FIG. 3. This would be especially useful in the case of an opaque film 5 having the ink printed on the outer surface and exposed to damage, and less needed in the case of FIG. 1 wherein the ink is already protected by the film 5 itself. In either case, however, a conventional high-slip film solely for label abrasion resistance would be advantageous, or a protective or color coating of the type described in copending patent application Nos. 07/432,442 and 07/431,968 identified above could be used. Other coatings would also be acceptable. The top coat adds to the impact resistance of the film label, additionally protects the film label against abrasion and acts to enhance the visual appearance of the container, label and contents.

The acrylic coating of the clear film and the acrylic inks and coating on the film both promote adhesion of the top coat materials to the label.

It will be appreciated that further modifications could be made to the embodiment disclosed above while still obtaining many of these advantages and without departing from the spirit and scope of the invention as defined in the appended claims.

What is claimed is:

1. A label for a container, comprising:
   a label layer carrying information thereon and having first and second sides, with said first side facing to the container; and
   a composite heat-activated adhesive of first and second layers, said first layer comprising a bonding material adhered to said first side of said label layer and to said second layer for bonding said second layer to said label layer, and said second layer comprising a heat activated adhesive material disposed on a side of said bonding material facing to the container for adhering said bonding material, and thereby said label layer, to said container.

2. A label according to claim 1, wherein said bonding material is a solvent-based vehicle.

3. A label according to claim 1, wherein said second layer comprises a mixture of said adhesive material and a coupling agent for enhancing a bond between said adhesive material and the container.

4. A label according to claim 3, wherein the volume ratio of said adhesive material to said coupling agent is between approximately 50:1 and 10:1.

5. A label according to claim 1, wherein said composite heat-activated adhesive is printed on said label layer.

6. A label according to claim 1, wherein said label layer comprises a base material and a printed ink layer on one side of said base material facing said composite heat-activated adhesive.

7. A label according to claim 1, wherein said label layer comprises a base material and a printed ink layer on one side of said base material opposite said composite heat-activated adhesive.

8. A label according to claim 6, wherein said base material is transparent.

9. A label according to claim 7, wherein said base material is transparent.

10. A label according to claim 7, wherein said base material is opaque.

11. A label according to claim 1, wherein said adhesive material is instantaneously activated when contacted by a surface temperature in excess of 180° F.

12. A label according to claim 1, wherein said composite heat-activated adhesive, upon contacting a container heated to 200° F. and thereafter cooling, exhibits a bond strength greater than the strength of said label layer.

13. A label according to claim 6, wherein the entire label is transparent except for said printed ink layer.

14. A label according to claim 1, wherein said second layer is formed in a pattern to permit the escape of air from between said label and container.

15. A label according to claim 14, wherein said pattern comprises a horizontal line pattern.

* * * * *